United States Patent [19]

McLaughlin, Jr.

[11] 4,389,774

[45] Jun. 28, 1983

[54] ASPIRATING CUTTER FOR CUTTING AND ASPIRATING FILAMENTARY MATERIAL

[75] Inventor: William D. McLaughlin, Jr., Charlotte, N.C.

[73] Assignee: Fiber Industries, Inc., New York, N.Y.

[21] Appl. No.: 281,813

[22] Filed: Jul. 9, 1981

[51] Int. Cl.³ .............................................. B23D 17/06

[52] U.S. Cl. ........................................ 30/133; 83/100; 242/35.5 A

[58] Field of Search .................... 30/133, 228; 83/100; 242/35.5 A

[56] References Cited

U.S. PATENT DOCUMENTS

| | | | |
|---|---|---|---|
| 3,175,290 | 3/1965 | Bunting, Jr. et al. | 30/228 |
| 3,570,339 | 3/1971 | Vandersip | 83/100 |
| 3,678,579 | 7/1972 | Slavik | 30/133 |
| 3,793,917 | 2/1974 | Flower et al. | 83/199 |
| 3,808,924 | 5/1974 | Ferguson | 30/133 X |
| 3,948,452 | 4/1975 | Burysek et al. | 242/35.5 A |
| 4,078,736 | 3/1978 | Corl | 242/35.5 A |

*Primary Examiner*—Jimmy C. Peters
*Attorney, Agent, or Firm*—Burns, Doane, Swecker & Mathis

[57] ABSTRACT

An aspirating cutter severs a traveling yarn and exhausts same to a remote location. The cutter comprises a housing and a hollow suction tube projecting forwardly from the housing. A rearward suction is generated in the suction tube. The suction tube includes first and second slots opening forwardly at the front end of the suction tube, which slots are arranged to receive a traveling yarn. The first slot includes a first cutting edge. An outer tube is rotatably mounted on the suction tube. The front end of the outer tube includes a recess and a projection. The recess is large enough to expose the first and second slots. The projection includes a second cutting edge. When the outer tube is rotated, the first and second cutting edges are moved into a yarn cutting mode to sever a downstream portion of the yarn such that the upstream portion of the severed yarn is sucked into the suction tube. One of the cutting edges is inclined, to produce a scissoring action urging the yarn toward the suction tube.

9 Claims, 3 Drawing Figures

ASPIRATING CUTTER FOR CUTTING AND ASPIRATING FILAMENTARY MATERIAL

BACKGROUND AND OBJECTS OF THE INVENTION

The present invention relates generally to the severing and aspirating of rapidly traveling filamentary material during, for example, the high speed winding of the filamentary material onto bobbins or spools to form packages of filamentary material. More particularly, it relates to an aspirating cutter which severs the filamentary material as it travels at high speed (say 200 mph) during removal of a full package, and aspirates the severed filamentary material to a remote source (e.g., to waste).

The manufacture of man-made or synthetic filament yarns is typically performed by extruding a molten polymer, such as polyester, polyamide, etc., through hole(s) in a spinneret and then cooling the filament(s) thus formed. Thereafter, the filaments may be gathered together to form a multi-filament yarn and, possibly after further treatment, are wound onto a tube so that a yarn package is formed.

Winding of the yarn is performed mechanically by winders which rotate one or more packages to wind-up the yarn while traversing the yarn along the package axis to achieve a uniform thickness of yarn being wound.

A doffing/donning operation (i.e., replacement of the yarn packages with empty tubes on the winder) is often performed manually by an operator who (i) severs the yarn, (ii) stops the rotary drive to the packages, (iii) replaces the packages with empty tubes, (iv) re-establishes the rotary drive, and (v) rethreads the yarn onto the empty tubes. Severing of the filamentary yarn has been conventionally performed with scissors while the inlet of a suction or aspirator gun is held against the yarn at a location above the point of severing. Once the yarn is severed, the tail end is wound onto the yarn package, while the newly formed leading end is sucked into the aspirator and fed to a waste collector. The suction gun is then placed onto a holder while the yarn packages are being replaced by empty tubes. When the empty tubes attain full speed, the operator manipulates the suction gun to attach the yarn to the rotating tubes so that a subsequent winding operation may begin.

Severing of the yarn has also been performed with an aspirating cutter of the type manufactured by Slack & Parr, Inc. of Charlotte, N.C. (model 4F-11). This cutter comprises a handle in which is disposed an aspirator nozzle for creating a vacuum in a suction tube which projects forwardly from the handle. This suction tube is surrounded by an outer tube which extends from the handle and is reciprocably driven by a trigger-actuated fluid motor in the handle. The outer tube includes a laterally opening slot positioned slightly rearwardly of the forward end of the outer tube. In practice, an operator manipulates the forward end of the waste gun laterally to cause the yarn to enter the slot in a lateral direction. Upon actuation of the trigger, the outer tube is driven longitudinally rearwardly, whereby the slot travels past the front end of the suction tube. The front edge of the slot is sharp, so that the yarn is severed. Upon being severed, the yarn becomes entrained within the suction flow of the suction tube. The outer tube is then moved forwardly to prepare the device for cutting and aspirating another filament while the previously cut yarn continues to be aspirated. This arrangement may be described as an in-line aspirating cutter since the cutting elements and suction tube are essentially aligned longitudinally. Such an aspirating cutter is suitable when the yarn is nearby and readily accessible. It can, however, be difficult to utilize when dealing with remote yarn, e.g., filaments located six or seven feet from the operation in areas of limited accessibility. The difficulty in laterally maneuvering the end of the cutter at that distance to engage a yarn will be appreciated, especially in cases where there exists little maneuvering space. Accordingly, it takes longer for an operator to capture the yarns, thereby reducing the quantity of winders that can be serviced by each operator, i.e., more operators are required.

Another type of side-entry, in-line aspirating cutter is described in U.S. Bunting, Jr. et al U.S. Pat. No. 3,175,290 issued Mar. 30, 1965.

Aspirating cutters have been proposed which include a forwardly facing slot so that the yarn can be captured in response to longitudinal motion of the cutter (e.g., see U.S. Pat. Nos. Flower et al 3,793,917 issued Feb. 26, 1974; Corl 3,915,398 issued Oct. 28, 1975; and Burysek et al 3,948,452 issued Apr. 6, 1976). In such arrangements, the suction manifold is typically spaced laterally of the slot, whereby the dimensions of the cutter are so large as to render the cutter cumbersome to manipulate in areas of low-accessibility.

In the afore-mentioned Flower et al patent, the cutter is of the rotary type having telescoping, relatively rotatable tubes wherein a cutter edge travels in a rotary path across a yarn-receiving slot. The use of suction air is disclosed at column 2, lines 35–59 of that patent, but without suggestion that the suction would be disposed in other than the common laterally spaced relationship. Moreover, the arrangement of the telescoping tubes in Flower et al would be undesirable in a cutter of the in-line flow type wherein the cutter must be able to cut one yarn while continuing to aspirate a previously cut yarn. This is so, because the rotary tube of Flower et al would likely contact and tension the previously cut yarn. As noted earlier, excessive tensioning of aspirating yarn can cause the yarn to break.

Thus, it will be appreciated that in instances where remote yarns are to be cut in spaces affording little maneuverability, it is desirable that the barrel of an aspirating cutter can be compact and capable of receiving the yarn during longitudinal motion. It is also desirable that the aspirating cutter be capable of cutting one or more additional yarns without cutting or disturbing the previously captured yarn(s). In this regard, excessive tensioning of the yarn can produce yarn breakage, whereupon the filaments emerging from the spinneret will wrap around the godet roll located above the winder and require manual untangling.

SUMMARY OF THE INVENTION

These objects are achieved by the present invention which involves an aspirating cutter for severing traveling filamentary material and exhausting same to a remote location. The aspirating cutter comprises a housing and a hollow suction tube projecting forwardly from the housing and being open at its front end. The suction tube includes at least one generally longitudinally extending first cutting edge at the outer periphery of the suction tube. A rearward suction is generated in the suction tube. An outer tube is mounted on the outside periphery of the suction tube and is co-axial with the latter. The outer tube includes a generally longitudinally extending second cutting edge at an inner periphery of the outer tube. That second cutting edge is spaced circumferentially from the first cutting edge in a non-cutting mode to form therebetween a receiving space for receiving traveling filamentary materials. The space is disposed at a downstream side of the suction tube with reference to the direction of travel of the filamentary material. One of the suction tube and outer tube being mounted for rotation relative to the other about the longitudinal axis. That one tube is rotated to converge the first and second cutting edges into a cutting mode to sever a downstream portion of the filamentary material such that the severed filamentary material becomes entrained within the suction flow and suction tube. The front end of the rotated tube is circumferentially recessed to avoid contact of that tube with previously severed filamentary material which is being exhausted in the suction flow while non-severed filamentary material is being subsequently severed by the cutting edge.

THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
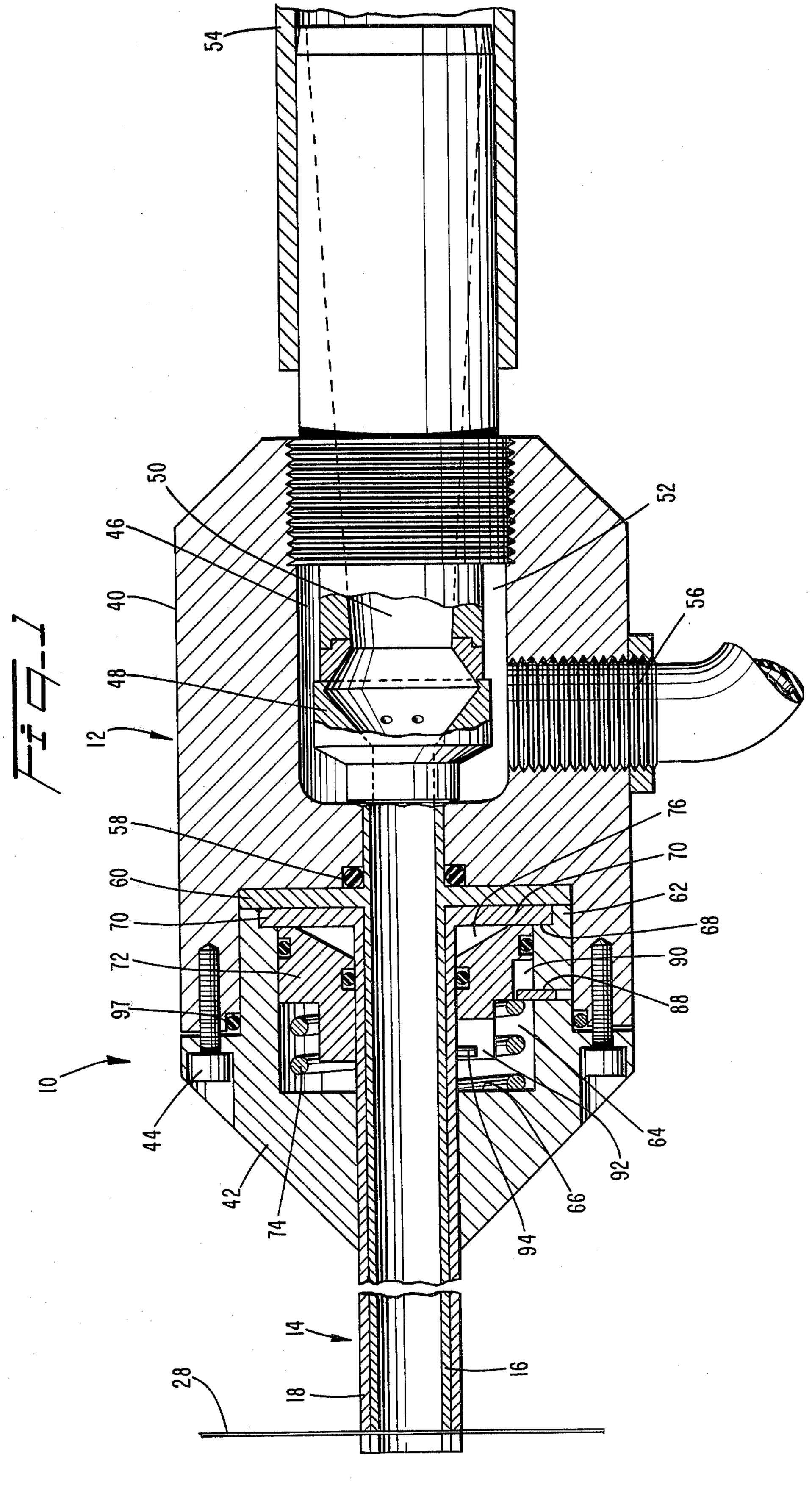
FIG. 1 is a longitudinal sectional view taken through an aspirating cutter according to the present invention.

An aspirating cutter or waste gun 10 according to the present invention comprises a housing 12 and a barrel 14 projecting forwardly therefrom. The housing may, in practice, be manually manipulated or mounted on a movable carriage.

The barrel 14 comprises a hollow suction tube which is stationary in the sense of being non-reciprocable and non-rotatable relative to the housing 12, and an outer tube 18 which is capable of rotation relative to the suction tube 16 about the common longitudinal axis of the tubes 16, 18. The suction tube 16 is longitudinally open at its front end to admit air. A rearward suction flow is generated in the suction tube by conventional means to be described hereinafter, along with a drive mechanism for producing rotation of the outer tube 18.

Figure 3:
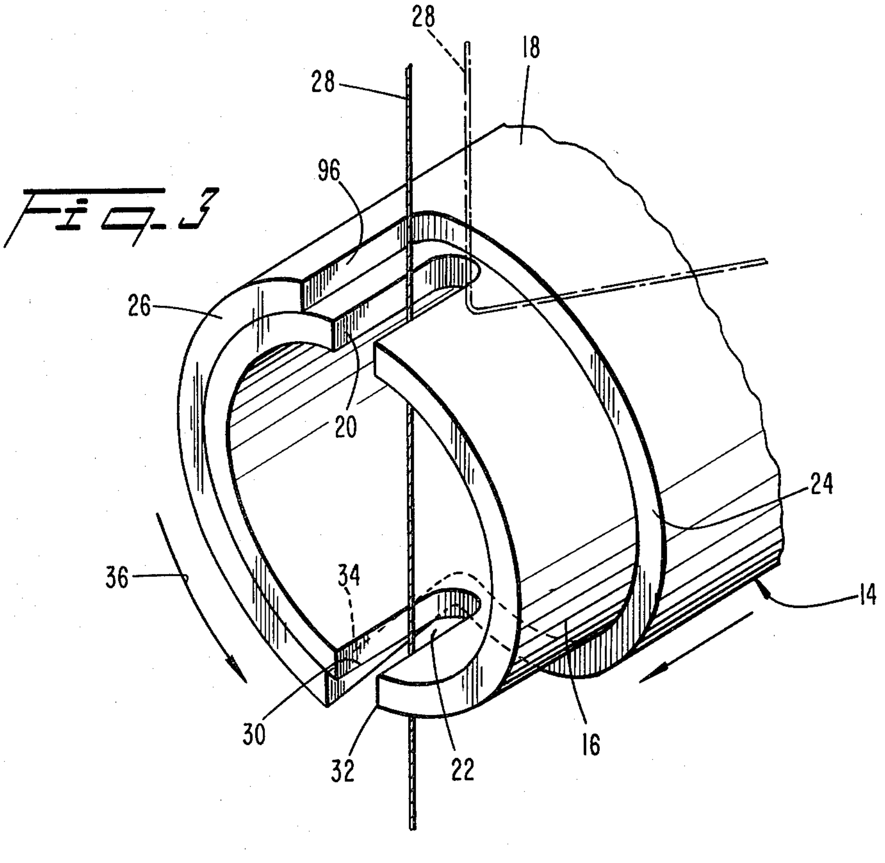
FIG. 3 is a perspective view of the front end of the barrel of the aspirating cutter in a non-cutting mode of the aspirating cutter.

The suction tube is longitudinally co-extensive with the outer tube (FIG. 3) and includes at its front end a pair of longitudinal, forwardly opening slots 20, 22 disposed at diametrically opposed, upper and lower locations.

A little more than half of the front end of the outer tube 18 has been circumferentially cut away to thereby form a recess 24 and projection 26 at the front of the outer tube 18. The recess 24 is sufficiently large to expose both of the slots 20, 22. When a yarn 28 travels through the slots 20, 22, the upper and lower slots constitute upstream and downstream slots 20, 22, respectively, from the standpoint of yarn travel. The downstream slot 22 includes a pair of radially outer edges 30, 32. The edge 32 which is situated farthest from the adjacent part of the projection 26 in a non-cutting mode is relatively sharp. The projection 26 includes a radially inner edge 34 which is also relatively sharp and travels in close relationship with the outer periphery of the suction tube 16.

It will be appreciated that the yarn 28 traveling through the slots 20, 22 of the suction tube 16, rotation of the outer tube 18 relative to the suction tube 16 in a direction 36 causing the radial inner edge 34 of the projection to travel circumferentially across the radial outer edge 32 of the downstream slot 22, the yarn 28 will be severed by those edges 32, 34.

Thus, those edges 32, 34 constitute cutting edges and may be relatively angled (i.e., non-parallel) to produce a scissoring action in a direction urging the yarn longitudinally inwardly (toward the housing) during a cutting operation. In this regard, either or both of the edges 32, 34 can be inclined. For example, the projection edge 34 can be inclined so that the front end of that edge leads the rear edge in the direction of rotation 36 of the outer tube 18.

It will be appreciated that when the cutting edges 32, 34 cut the yarn 28, the yarn is instantly sucked into the suction tube 16 and aspirated to waste. While a captured yarn 28' is conducted to waste through the upstream slot 20 and the barrel 14 (see the broken lines in FIG. 3), a subsequent yarn 28 can be cut and aspirated without interfering with the previously captured yarn(s). That is, the upper end of the projection 26 remains spaced from the upstream 20 slot at all times during cutting and non-cutting modes. Accordingly, it is assured that no tension on the previously cut yarn 28' can be produced by the outer tube during cutting operation of the aspirating cutter which would tend to break such yarn.

Moreover, the cutter gun is able to engage a yarn in response to travel of the gun in a longitudinally forward direction, which means that the operator can more easily line-up the filament with the receiving slots 20, 22 than in cases where lateral motion of the gun is required to capture a yarn. Since the barrel 18 is highly streamlined and does not need to be moved laterally to engage a filament, the waste gun is readily adapted for use in remote spaces of limited accessibility.

The suction tube-rotating mechanisms may assume various designs. Preferably, the housing 12 includes a base portion 40 and a head portion 42 removably affixed thereto by bolts 44. The base portion includes a central bore therethrough, a rear portion 46 of which is of enlarged diameter to receive a suction-generating assembly. The latter is conventional and comprises an air cap 48 which has a series of openings arranged to conduct fluid rearwardly into a venturi passage 50 from a surrounding plenum chamber 52. This action produces a vacuum which is transmitted through the suction tube 16.

The suction fluid is conveyed through a waste conduit 54 to a suitable waste receiver. Pressurized fluid, preferably air, is admitted to the plenum chamber 52 through an inlet port 56 in the housing base. An O-ring 58 seated in the housing base bears against a longitudinal part of the suction tube 16 and against a lateral flange part 60 thereof to create an air-tight seal around the suction tube.

The suction tube is fixedly clamped to the housing base 40 by a lip 62 of the head 42. The outer tube 18 is mounted for rotation relative to the suction tube 16 about the common longitudinal axis of the tubes, by a rotary drive mechanism. That drive mechanism is disposed within a compartment 64 bordered at one end by the lateral flange 60 of the suction tube 16 and at the other end by a wall 66 of the head 42 of the housing 12.

The housing head 42 includes a radial shoulder 68 which extends in front of a lateral flange 70 of the outer tube 18 to restrain the latter from longitudinal movement relative to the housing.

Disposed within the compartment 64 is a reciprocable piston 72 which slides longitudinally along the outer tube 18. A spring 74, such as the coil spring depicted, or perhaps an air spring, acts between the front of the piston 72 and the wall 66 of the head 42 to yieldably bias the piston 42 rearwardly.

Figure 2:
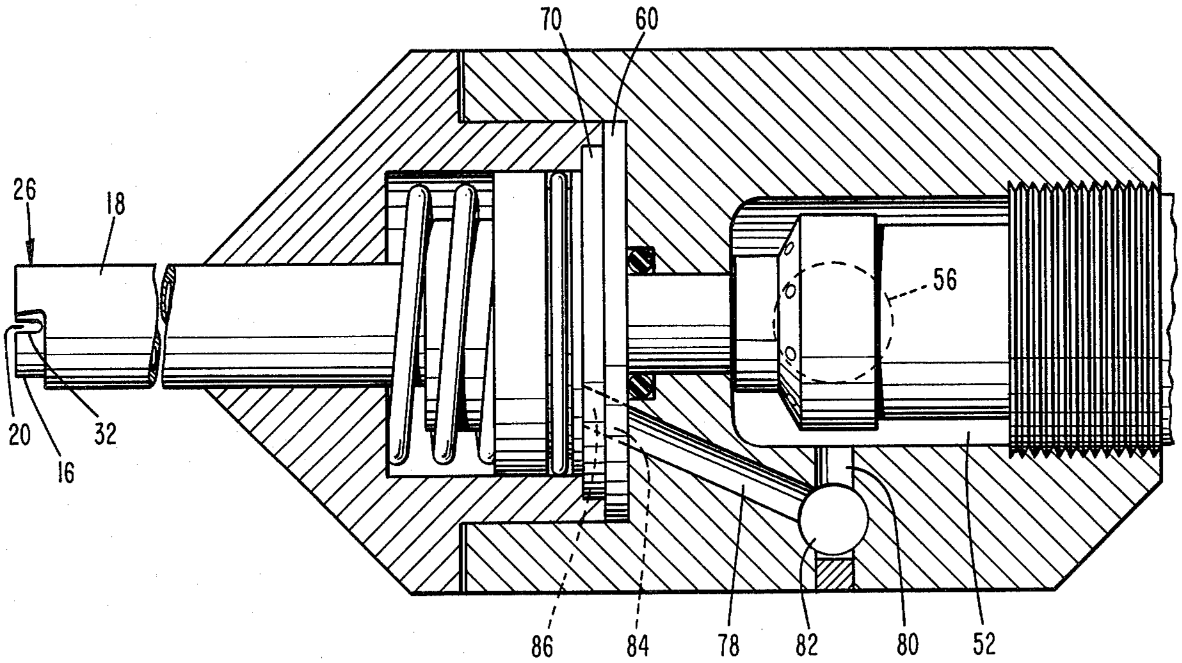
FIG. 2 is a longitudinal sectional view taken through the aspirating cutter along a plane disposed at an angle of 90° relative to the plane forming FIG. 1.

A working chamber 76 is disposed behind the piston 72 and is fluidly connected to pressurized air in the plenum chamber 52 via a fluid passage 68, 80 in the housing base 40 (FIG. 2). The fluid passage 78, 80 has a trigger actuated poppet valve 82 therein to enable an operator to bleed air from the plenum chamber 52 to the working chamber 76 to shift the piston 72 forwardly against the bias of the spring 74. The passage 78 includes an opening 84 in the flange 60 of the suction tube 16 and an arcuate slot 86 in the flange 70 of the outer tube 18. The slot 86 serves to maintain communication between the passage 78 and the working chamber 76 during rotation of the outer tube 18 and its flange 70. Final sealing of chamber 76 is achieved by an O-ring 97 positioned between the base 40 and head 42 radially inwardly of the bolts 44.

In order to prevent rotation of the piston 72 during reciprocation thereof, a pin 88 projects radially from the housing head 42 and is received in a longitudinal slot 90 of the piston 72. This pin/slot connection restrains the piston 72 against rotation.

Rotary movement of the outer tube 18 is produced by means of a helical camming slot 92 in the piston 72, which slot 92 receives a radial follower pin 94 projecting radially from the outer tube 18. As the piston 72 reciprocates linearly (i.e., without rotation), the helical slot 90 slides relative to the pin 94, camming the pin 74 circumferentially to produce rotational movement of the outer tube 18. Thereafter, the spring 74 returns the piston, and thus the outer tube, to the non-cutting position. The degree to which the rotation occurs is governed by the shape of the helical slot 92 and by the extent of linear movement of the piston 72. Those parameters are chosen to assure that the upper end 96 of the projection 26 of the outer tube 18 does not interfere with any previously-captured yarn(s) 28' traveling toward the suction tube 16.

In operation, the suction gun 10 is advanced toward the filament 28 manually or by a movable frame. The forwardly open slots 20, 22 capture the traveling yarn 28 in a longitudinal direction. Thus, the gun 10 can be employed in areas of limited available space. With the yarn seated at the inner ends of those slots 20, 22, the trigger valve 82 (FIG. 2) is actuated whereby pressurized air travels through passage 78, 80 and enters the working chamber 76 to forwardly advance the piston 72 in a linear direction against the bias of the spring 74. This linear movement is transmitted as rotary motion to the outer tube 18 by the pin-and-helical-slot connection 94, 92. The cutting edge 34 of the projection 26 on the outer tube 18 travels across the cutting edge 32 of the suction tube 16 to sever the yarn 28. This cutting action is in the form of a scissoring action, due to the inclination of the cutting edge 34, which urges the yarn longitudinally inwardly as it is being cut. This maximizes the cutting efficiency and guarantees that the yarn cannot escape without being cut. The portion of the cut yarn upstream of the cut point is entrained within the suction in the suction tube 16 and is conducted to waste. Thereafter, an additional yarn(s) can be severed while the previously cut yarn(s) travels to waste. Importantly, no part of the outer tube 18 contacts the previously cut yarn 28 and thus does not impose excessive tension in the latter which might otherwise break the yarn.

Although the invention has been described in connection with a preferred embodiment thereof, it will be appreciated by those skilled in the art, that additions, modifications, substitutions, and deletions not specifically described, may be made without departing from the spirit and scope of the invention as defined in the appended claims.

What is claimed is:

1. An aspirating cutter for severing traveling filamentary material and exhausting same to a remote location, comprising:
- a housing,
- a hollow suction tube projecting forwardly from said housing, and being open at its front end,
  - said suction tube including at least one generally longitudinally extending first cutting edge at the outer periphery of said suction tube,
- means for generating a rearward suction in said suction tube,
- an outer tube mounted on the outside periphery of said suction tube and being co-axial with the latter,
  - said outer tube including a generally longitudinally extending second cutting edge at an inner periphery of said outer tube and spaced circumferentially from
  - said first cutting edge in a non-cutting mode to form therebetween a receiving space for receiving traveling filamentary material,
  - said space being disposed at a downstream side of said suction tube with reference to the direction of travel of the filamentary material,
  - one of said suction tube and outer tube being mounted for rotation relative to the other about said longitudinal axis, and
- means for rotating said one tube to converge said first and second cutting edges into a cutting mode to sever a downstream portion of the filamentary material such that the severed filamentary material becomes entrained within the suction flow in said suction tube,
  - the front end of said one tube being circumferentially recessed to avoid contact of said one tube with previously severed filamentary material being exhausted in said suction flow while non-severed filamentary material is being subsequently severed by said cutting edges.

2. Apparatus according to claim 1, wherein said outer tube constitutes said one tube.

3. Apparatus according to claim 1, wherein the other of said tubes includes first and second diametrically opposed, generally longitudinally extending slots opening forwardly at the front end of said other tube, the cutting edge of said other tube being defined by an edge of said first of said slots, said slots being arranged to receive traveling filamentary material which when severed, continues to travel in said second slot.

4. Apparatus according to claim 3, wherein said one tube includes circumferentially contiguous recess means and projection means, said recess means being large enough to expose said first and second slots, and said projection forming said second cutting edge and being arranged to avoid contact with previously severed filamentary material in said second recess as non-severed filamentary material is being severed by said cutting edge.

5. Apparatus according to claim 4, wherein said outer tube constitutes said one tube.

6. Apparatus according to claim 1, wherein at least one of said cutting edges is inclined relative to the longitudinal direction to create a scissoring cutting action which urges the filamentary material longitudinally inwardly.

7. Apparatus according to claim 1, wherein said means for rotating comprises a linearly reciprocable, fluid driven piston in said housing, said piston connected to said one tube by means of a pin-and-helical-slot connection whereby said one tube is rotated in response to linear travel of said piston.

8. An aspirating cutter for severing a traveling yarn and exhausting same to a remote location, comprising:

a housing, a hollow suction tube projecting forwardly from said housing and being longitudinally open at its front end, said suction tube including first and second diametrically opposed, generally longitudinally extending slots opening forwardly at the front end of said suction tube, said slots being arranged to receive a traveling yarn, said first slot including an edge at the radially outer periphery of said suction tube which forms a first cutting edge, means for generating a rearward suction flow in said suction tube, an outer tube mounted on the outside periphery of said suction tube and being coaxial with the latter, the front end of said outer tube including circumferentially contiguous recess means and projection means, said recess means being large enough to expose said first and second slots, and said projection means including a generally longitudinally extending edge at the radially inner periphery of said outer tube to form a second cutting edge spaced circumferentially from said first cutting edge in a non-cutting mode, said outer tube being mounted for rotation relative to said inner tube about the common longitudinal axis of said tubes, one of said cutting edges being inclined to produce a scissoring action when said cutting edges converge, to urge the yarn longitudinally inwardly, means for rotating said outer tube to converge said first and second cutting edges into a yarn cutting mode to sever a downstream portion of the yarn such that the upstream portion of the severed yarn becomes entrained within the suction flow in said suction tube and continues traveling through said second slot, said projection means being arranged to avoid contact with a previously severed yarn traveling in said second recess as a non-severed yarn is being subsequently severed by said cutting edges.

9. Apparatus according to claim 8, wherein said means for rotating comprises a linearly reciprocating, fluid driven piston in said housing, said piston connected to said outer tube by means of a pin-and-helical-slot connection whereby said outer tube is rotated in response to linear travel of said piston.

* * * * *